Patented July 23, 1935

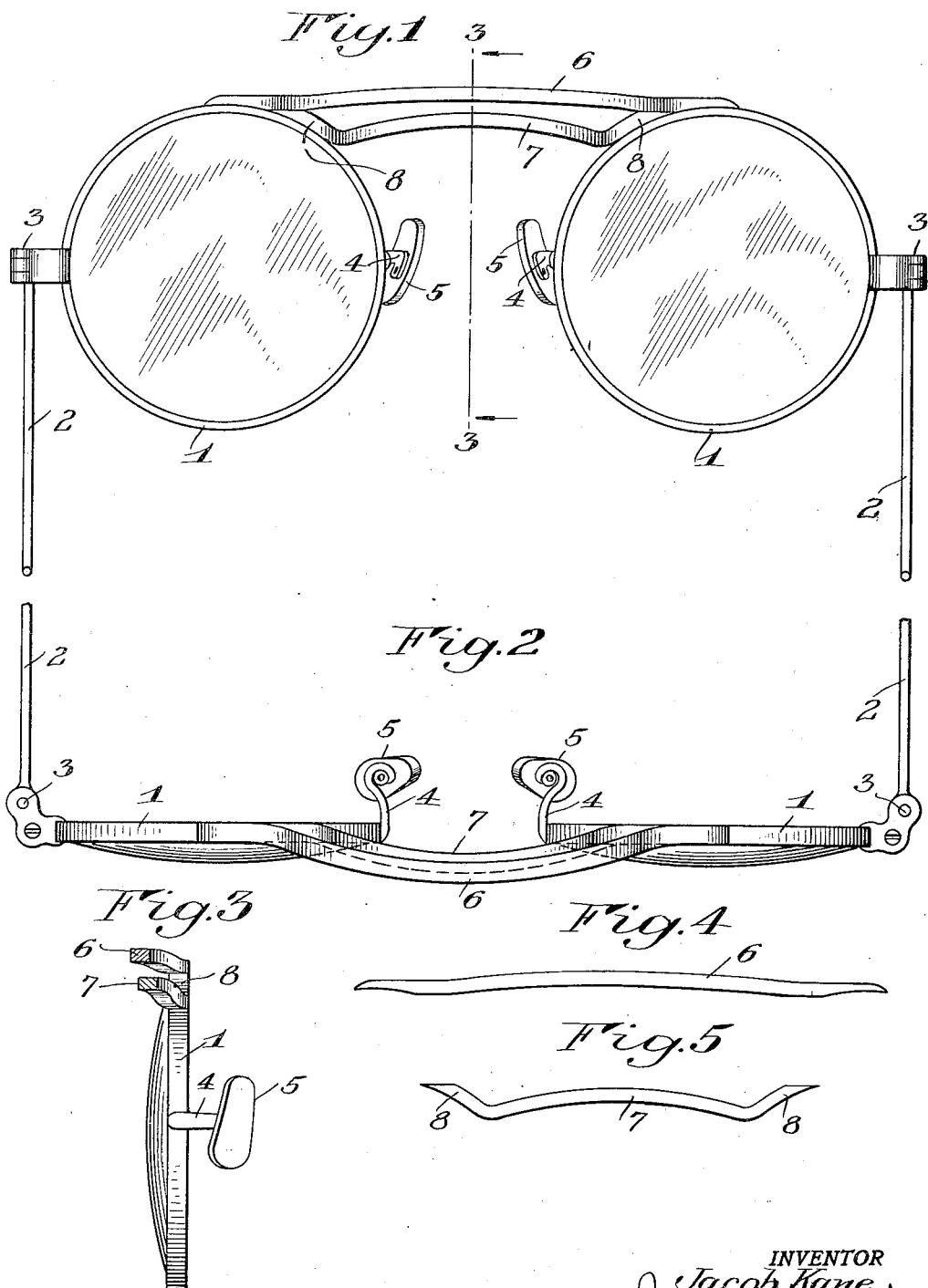

2,009,012

UNITED STATES PATENT OFFICE 2,009,012

OPHTHALMIC MOUNTING

Jacob Kane, Rochester, N. Y.

Application March 17, 1934, Serial No. 716,131

4 Claims. (Cl. 88—43)

My present invention relates to optics and more particularly to eye glasses and spectacles, and it has for its object to provide an ophthalmic mounting of the metallic type, such as a spectacle, that can be fitted accurately to the nose of the wearer and the lens frames or rims of which will be connected with great rigidity so that the mounting will be strong and durable and the lens axes and pupillary distance maintained accurately at all times. A further object of the invention is to produce a mounting having these characteristics which will, at the same time, be very light in weight and pleasing in appearance.

To these and other ends, the invention resides in certain improvements and combinations of parts, all as will be hereinafter more fully described, the novel features being pointed out in the claims at the end of this specification.

In the drawing:

Fig. 1 is a front elevation of a spectacle mounting constructed in accordance with and illustrating one embodiment of my invention;

Fig. 2 is a top plan view thereof;

Fig. 3 is a central vertical section taken on the line 3—3 of Fig. 1 and looking in the direction of the arrows;

Fig. 4 is a detail front view of the upper bridge member, and

Fig. 5 is a detail front view of the lower bridge member.

Similar reference numerals throughout the several views indicate the same parts.

Referring more particularly to the drawing, 1 indicates the usual metallic lens frames or rims grooved to receive the ground edges of the lenses and having temples 2 pivoted thereon at 3, as is customary. At their proximate sides the rims are fitted with suitable guard arms 4 carrying the usual or any preferred type nose pads 5. Above these and also positioned so that it is well above the nose of the wearer is a bridge piece consisting of an upper element 6 and a lower element 7. Both elements are composed of light strong metal, preferably of the cross sectional area shown in Fig. 3. The upper element 6 is substantially horizontal, extends tangentially to the two rims of one and its ends are fitted to and soldered upon the tops of these rims. The lower element 7 is spaced from the upper element but bowed upwardly toward it. Its ends are bent upwardly at 8 to follow the contour of the rims and their tips fitted to abut element 6 where all the parts are soldered together to finally produce an integral structure. Both elements are also preferably bowed outwardly, as shown in the plan view, to relieve contact with the brow.

This connection 6—7 is not essentially a bridge at all in this art as it does not contact the nose, the other means being provided for this purpose, but it is a strong truss connection that holds the lenses by their rims with the greatest rigidity and against strains in all directions. It is preferable not to accurately superpose the two truss elements of the bridge but to offset them slightly relatively from front to rear, as appears in Figs. 2 and 3, so that their flexing points are different against horizontal strain.

It may not be necessary in some instances to provide the portions 8 for a bearing of the lower members against the rims, the end thereof being simply soldered to the rim at the point of intersection.

I claim as my invention:

1. In an ophthalmic mounting, the combination with a pair of metallic lens frames, of a pair of nose grips, and a metallic bridge arranged entirely above and independently of the said nose grips and of the wearer's nose and brows, said bridge embodying an upper element rigidly connected to the tops of the lens frames substantially tangentially thereof and, spaced therefrom, a lower element also connecting the same, the two elements constituting a truss construction rigidly connecting the lens frames.

2. An ophthalmic mounting in accordance with claim 1 further characterized by the fact that the lower bridge element is arched upwardly in reference to the upper element.

3. An ophthalmic mounting in accordance with claim 1 further characterized by the fact that the lower element is provided with upturned ends laid against the frames and with their tips meeting the upper bridge member.

4. An ophthalmic mounting in accordance with claim 1 further characterized by the fact that both bridge elements are bowed forwardly with curvatures on different radii to produce a trussing function in a horizontal plane also.

JACOB KANE.